(12) United States Patent
Haginoya et al.

(10) Patent No.: US 7,097,924 B2
(45) Date of Patent: Aug. 29, 2006

(54) MAGNETIC RECORDING MEDIA AND METHOD OF FORMING THEM

(75) Inventors: Chiseki Haginoya, Odawara (JP); Kaori Suzuki, Mitaka (JP); Hisashi Kimura, Odawara (JP); Masaaki Futamoto, Shiroyama (JP); Hideo Matsuyama, Hannou (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/747,097

(22) Filed: Dec. 30, 2003

(65) Prior Publication Data
US 2004/0166372 A1   Aug. 26, 2004

(30) Foreign Application Priority Data
Feb. 24, 2003   (JP)   ............... 2003-045262

(51) Int. Cl.
*G11B 5/65* (2006.01)
*G11B 5/17* (2006.01)
*G11B 7/20* (2006.01)

(52) U.S. Cl. ............... 428/829; 428/832.1; 369/94; 360/135

(58) Field of Classification Search .......... 428/65.3, 428/694 T, 694 TM, 694 TS, 694 TR, 611, 428/827, 829, 832, 832.1, 832.2, 831.2; 360/125, 360/131, 135, 136; 369/93, 94
See application file for complete search history.

(56) References Cited

U.S. PATENT DOCUMENTS

| | | | | |
|---|---|---|---|---|
| 4,950,548 A | * | 8/1990 | Furusawa et al. ........... | 428/611 |
| 5,587,223 A | | 12/1996 | White | |
| 5,766,718 A | * | 6/1998 | Matsuda et al. ........... | 428/65.3 |
| 6,351,339 B1 | * | 2/2002 | Bar-Gadda ............ | 428/694 TR |
| 6,686,070 B1 | * | 2/2004 | Futamoto et al. .... | 428/694 TM |
| 6,716,516 B1 | * | 4/2004 | Futamoto et al. .... | 428/694 TM |
| 6,777,066 B1 | * | 8/2004 | Chang et al. ........ | 428/694 TM |
| 6,813,116 B1 | * | 11/2004 | Nakamura et al. .......... | 360/125 |
| 6,815,082 B1 | * | 11/2004 | Girt ......................... | 428/611 |
| 2001/0030832 A1 | * | 10/2001 | Tomiyama et al. ......... | 360/126 |
| 2002/0015865 A1 | * | 2/2002 | Segawa et al. ........ | 428/694 TS |
| 2002/0122958 A1 | * | 9/2002 | Tanahashi et al. ... | 428/694 TM |
| 2003/0162057 A1 | * | 8/2003 | Matsunuma et al. ... | 428/694 TS |

FOREIGN PATENT DOCUMENTS

| | | |
|---|---|---|
| JP | 1-155897 | 6/1989 |
| JP | 2-100308 | 4/1990 |
| JP | 11-284777 | 10/1999 |
| JP | 2000-76333 | 3/2000 |
| JP | 2000-286842 | 9/2000 |

OTHER PUBLICATIONS

IEEE Transactions on Magnetics, vol. 36, No. 1, Jan. 2000, "The Feasability of Magnetic Recording at 1 Terabit per Square Inch", R. Wood, pp. 36-42.

* cited by examiner

*Primary Examiner*—Carol Chaney
*Assistant Examiner*—Louis Falasco
(74) *Attorney, Agent, or Firm*—Mattingly, Stanger, Malur & Brundidge, P.C.

(57) ABSTRACT

The present invention is directed to-carrying out a high density magnetic recording to a material having a large coercive force by perpendicular magnetic recording head.

By giving a patterning onto a soft magnetic under layer of a perpendicular two-layer recording media in sync with a period of a recording bit, a magnetic field from a write head can be allowed to converge to a soft magnetic column. Therefore, a magnetization reversal of the magnetic recording media material having a large anisotropic constant becomes possible, and then a high density magnetic recording can be achieved.

19 Claims, 14 Drawing Sheets

MAGNETIC RECORDING MEDIA AND METHOD OF FORMING THEM

BACKGROUND OF THE INVENTION

1. Field of the Invention

The present invention relates to a magnetic recording media, a magnetic recording system and a method of forming them.

2. Discussion of the Background

Recently, in a magnetic recording media, as a recording density is more enhanced, a more stable magnetization in recording against a thermal fluctuation is required. Therefore, there is a tendency that the uniaxial magnetic anisotropy constant (Ku) of a magnetic material is increasing, which is used as a material of a magnetic layer responsible for recording. A large recording magnetic field is required so as to carry out recording on the magnetic layer having a large Ku. Consequently, a study has been conducted as to a write head which generates the recording magnetic field, from both structural and material viewpoints. In the meantime, there has been suggested a perpendicular recording method where two-layer perpendicular media provided with a soft magnetic under layer and a single magnetic polar head are combined.

In the method above, a main pole of the write head, the soft magnetic under layer, and an auxiliary pole of the write head form a closed magnetic circuit, and then larger amount of magnetic flux passes through the magnetic layer, comparing to a conventional in-plane recording. Therefore, the recording method using the two-layer perpendicular media has a higher efficiency in utilizing of the recording magnetic field, comparing to the in-plane recording method which carries out recording by use of only in-plane substances in the recording magnetic field. Therefore, it has been considered that according to the recording method using the two-layer perpendicular media, recording onto recording media with a higher Ku is possible, than the case where the in-plane recording method is used.

However, since the magnetic field intensity applied on the media does not go over the intensity generated in the main pole, a saturation flux density (Bs) of the main pole material is equal to an upper limit of the recording magnetic field intensity. The saturation flux density has a physical restriction determined by a material, and consequently, the upper limit of the recording magnetic field applied on the media is determined based on the value of the restriction. In order to increase the saturation flux density, various materials have been developed, but it is impossible to increase the density infinitely.

Further, it is known that a material with a high saturation flux density, currently under development, generally has a problem in corrosion resistance. Therefore, as the uniaxial-magnetic anisotropy constant (Ku) of a recording media increases, it is conceivable that recording, on such recording media may become difficult in the future, even if the perpendicular recording method is used.

Further, as a form of the recording media suitable for high recording density, there is known a method, so-called patterned media, where a magnetically isolated magnetic particle is arranged regularly and recording is performed by corresponding one bit to one particle; This method is disclosed, for example, by Japanese Patent Application Laid-Open Publication No. Hei 1-155897, No. Hei 2-100308, and U.S. Pat. No. 5,587,223 (Hereinafter, referred to as Patent Documents 1, 2 and 3, respectively). In this method, noises due to instability in the magnetic state within the bit transition region are not generated, and it is possible to make 1 bit as small as possible until the limit of the thermal fluctuation. Therefore, it is conceivable that this method is advantageous to the high-density magnetic recording.

In the case of the patterned media, it is possible to make equal the size of the magnetic particle forming the bit and the size of one bit. Therefore, it is possible to achieve a larger volume (v) for a magnetization reversal unit, than that of continuous media where one bit is made of a large number of grains. In other words, it is conceivable that if compared in a same recording density, Ku is allowed to be smaller on the patterned media than a conventional continuous media.

However, even though the patterned media recording method is used, if Ku of the magnetic layer increases with the enhancement of recording density, it is conceivable that recording may become difficult, as in the case where the continuous media is used.

[Patent Document 1]
Japanese Patent Application No. Hei 1-155897

[Patent Document 2]
Japanese Patent Application No. Hei 2-100308

[Patent Document 3]
U.S. Pat. No. 5,587,223

[Patent Document 4]
International Application No. PCT/JP01/07211

[Patent Document 5]
Japanese Patent Application Laid-Open Publication No. 2001-110001

[Patent Document 6]
Japanese Patent Application Laid-Open Publication No. 2001-256605

[Patent Document 7]
Japanese Patent Application Laid-Open Publication No. 2002-92821

[Non-Patent Document 1]
R. Wood, IEEE Transaction on Magnetics Vol. 36 (2000), No. 1, pp. 36

SUMMARY OF THE INVENTION

The present invention provides a means for solving a problem that it is difficult to carry out a magnetic recording onto a recording bit made of a magnetic material having a large anisotropy, without any particular upgrading in a write head side. The present invention further provides a means for obtaining a steep distribution of a recording magnetic field.

In order to achieve the above objective, the present invention takes a step that a soft magnetic under layer of the two-layer perpendicular recording media is subjected to patterning. The inventors of the present invention have found that by forming subtle concavity and convexity (tracks of convex portions, which are spaced from one another) on a surface of the soft magnetic under layer, the recording magnetic field from a single magnetic polar head is increased. By forming tracks of convex portions on the surface of the soft magnetic under layer (hereinafter referred to as "soft magnetic columns"), the recording magnetic field generated by the write head converges to the soft magnetic columns, and useless magnetic flux can be reduced, which has conventionally been flown away between the recording bits. Therefore, not only the recording magnetic filed converges to the columns, but also a size of the magnetic field can be enlarged.

Further, since the recording magnetic field converges to a bit on which recording is to be carried out, so-called "blots in writing" can be reduced, and also a track property can be enhanced.

The second feature of the present invention is directed to a method for forming a perpendicular magnetic recording media characterized in that a surface of the soft magnetic under layer is subjected to patterning. As a method of the patterning, there is a method where the soft magnetic under layer is subjected to patterning just after it is formed, and subsequently an intermediate layer and a magnetic layer are formed. There is another method where forming up to the magnetic layer is firstly completed, and then patterning is given from upper side of the magnetic layer.

DESCRIPTION OF THE PREFERRED EMBODIMENTS

Hereinafter, preferred embodiments of the present invention will be explained in detail, with reference to the attached drawings.

EXAMPLE 1

Figure 1:
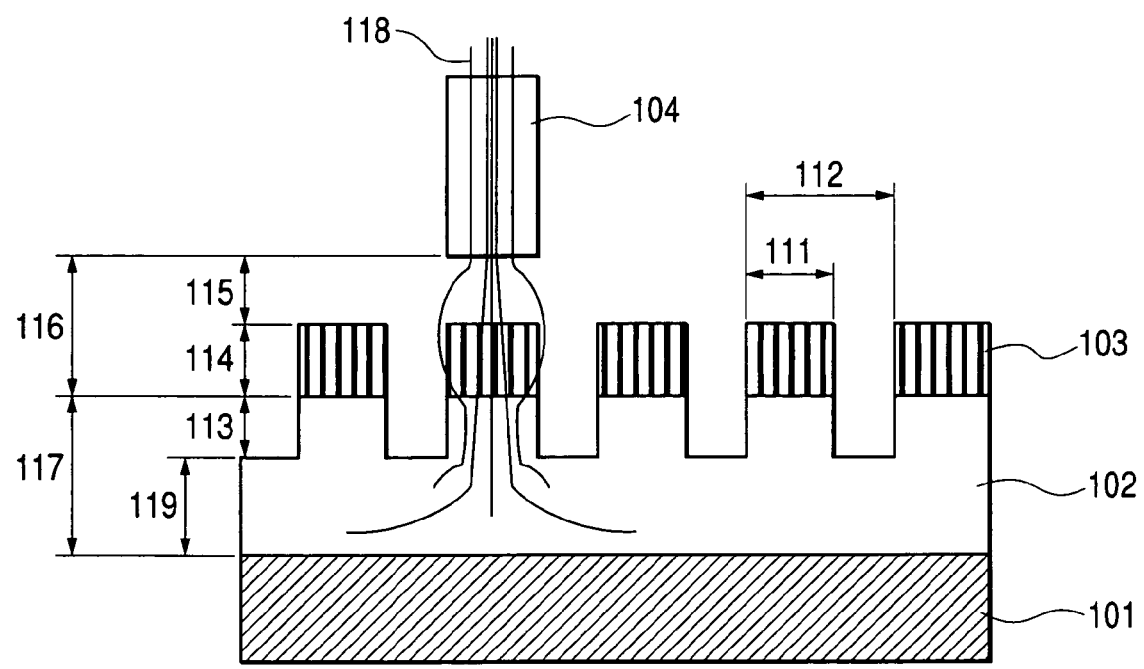
FIG. 1 is a diagram showing one embodiment of the recording media relating to the present invention.

FIG. 1 is a cross sectional view schematically showing the perpendicular magnetic recording media according to one embodiment of the present invention. As shown in the sectional view of FIG. 1, the magnetic recording media has a structure in which various layers such as a foundation layer and a magnetic layer are formed on a circular shaped disk substrate. On the surface of the recording media, track patterns including a servo region and a data region are formed concentrically. In FIG. 1, a direction perpendicular to the sheet face, direction A, indicates a track running direction, and the direction-parallel to the sheet face, direction B, indicates a track width direction. In other words, a magnetic head 104 proceeds along the direction A, with respect to the sheet face. The magnetic head 104 floats, with maintaining a predetermined flying height 115 with respect to the recording media.

The perpendicular magnetic recording media of the present example is obtained by forming on a glass substrate 101 having thickness of 0.64 mm, a soft magnetic under layer 102 and a hard magnetic layer 103 making up a recording bit. The hard magnetic layer 103 is subjected to a patterning, which reaches the soft magnetic under layer, and on the surface of the under layer, concavity and convexity are formed. Further, in the recording media, various layers such as an adhesive layer and an alignment layer are included so as to obtain necessary magnetic properties, even though those are not illustrated in FIG. 1.

For the hard magnetic layer 103, Cobalt Chrome Platinum (CoCrPt) alloy having a perpendicular anisotropy was used. In order to avoid precipitation of non-magnetic material into a crystalline grain boundary, deposition was carried out at a room temperature. The saturation flux density (Bs) of the hard magnetic layer 103 here used was 2500 Gauss (Bs=2500 Gauss) and the anisotropic magnetic field Hk was 12000 Oe (Hk=12000 Oe). When an average gradient was obtained as a magnetic susceptibility, it is considered to be $\chi_{rec}$=Bs/Hk~0.2. In other words, the relative permeability $i_{rec}$ is approximately 1.2. Similarly, for a soft magnetic under layer 102, Cobalt Tantalum Zirconium (CoTaZr) alloy with the relative permeability of $i_{s1}$~250 was employed.

The hard magnetic layer 103 is formed in such a manner that the length in the track width direction is to be as represented by the reference numeral 111, and the center distance from the adjacent track is to be as represented by the reference numeral 112. Therefore, the recording bit recorded on the perpendicular recording media of the present example has a track pitch equal to the distance 112. Similarly, in the direction perpendicular to the sheet face, though it is not illustrated in FIG. 1, patterning is given so that the column center distance corresponds to the minimum bit length. Further, the hard magnetic layer is configured by a plurality of columns which are arranged regularly and in discrete manner, so as to form a code arrangement (recording bit) corresponding to a modulation method of the information to be recorded. The minimum bit length may be or may not be equal to the center distance 112 from the adjacent track, and it is determined in view of the write head, read-write property, and so on.

Reference numeral 114 indicates a thickness of the hard magnetic layer 103. The portions where the recording bits do not exist, the soft magnetic under layer 102 are depressed by the digging depth 113 from the soft magnetic under layer thickness 117. Reference numeral 116 indicates a distance between the SPT head and soft magnetic under layer, and it is equal to the sum of a distance (flying height) 115 between the lowermost portion of the recording magnetic pole (main pole) of the write head and the uppermost portion of the recording media, and the thickness of magnetic material 114. Actually, on the surface of the hard magnetic layer 103, a protective layer and a lubricating layer are formed. Therefore, the distance between the SPT head and the soft magnetic under layer 116 includes the thickness of such protective layer, lubricating layer and all the other-layers formed on the magnetic layer.

Magnetic flux 118 coming out from the main pole of the SPT writer 104 passes through the hard magnetic layer 103 just below and it is absorbed in the column of the soft magnetic under layer 102. Further, there exists a magnetic flux which is absorbed in the soft magnetic under layer 102 without passing through the magnetic layer 103.

At this timing, according to the magnetic permeability of the materials forming the SPT writer 104, the soft magnetic under layer 102 and the magnetic layer 103, also according to the distance between SPT head and the soft magnetic under layer 116, the digging depth 113, a shape of the SPT writer 104 and the like, converging manner of the magnetic flux, that is, a recording magnetic field is varied. The soft magnetic under layer 102 is required so as to make a magnetic path for refluxing the magnetic flux from the main pole of the SPT writer 104 into the auxiliary pole thereof (not illustrated). Further, the magnetic flux from the main pole of the SPT writer 104 passes through the hard magnetic layer 103 on the column of the soft magnetic underlayer 102, in such a manner as converging to the column, and then, it is absorbed therein. Subsequently, it is refluxed to the auxiliary pole (not illustrated) of the SPT writer 104 via a flat region of the soft magnetic under layer 102. Generally, as the thickness 117 of the soft magnetic under layer 102 is thicker, magnetic reluctance becomes smaller, and thus more effective.

On the other hand, as for the soft magnetic under layer 102, since it is a film allowed to grow below the magnetic layer 103, less concavo-convex surface is preferable. If a polycrystalline soft magnetic material is used for the soft magnetic under layer 102, it is known that the unevenness on the surface is made larger with an increase of the soft magnetic under layer thickness 117, according to epitaxial growth condition. Since the soft magnetic under layer 102 having a large unevenness on the surface may cause a deterioration of magnetic properties of the magnetic layer 103 and a head crush, it is desirable that the soft magnetic under layer thickness 117 is equal to or less than 500 nm.

Further, from a viewpoint of production cost, there is a practical upper limit for the soft magnetic under layer thickness 117. Under this restriction, it is not possible to increase the thickness 117 infinitely, and the thickness of the soft magnetic flat region 119 has to be made smaller with the increase of the digging depth 113.

As the soft magnetic under layer, 102 approaches to saturation, a property for refluxing the magnetic flux becomes more deteriorated. Therefore, it is required to be used in a state of unsaturated. Consequently, it is desirable that a product of the magnetized amount of the under layer flat region, i.e., the saturation flux density of the soft magnetic under layer 102, and the flat region thickness 119, becomes larger than a product of the magnetized amount of the SPT head, i.e., the saturation flux density of the SPT compositional elements, and the thickness of the main pole (a length in the bit length direction, i.e., a direction perpendicular to the sheet face).

According to the request above, the upper limit of the digging depth 113 is determined. In the present example, it is designed such that the saturation flux density of the SPT head is 2.2 T, the main pole thickness is 200 nm, and the saturation flux density of the soft magnetic under layer 102 is 1.8 T. Therefore, it is desirable the flat region thickness 119 is equal to or more than 244 nm.

Further in the present example, since the soft magnetic under layer thickness 117 is designed to be 300 nm, the digging depth 113 is required to be equal to or less than 55 nm. Similarly, even in the case where other materials or shapes are employed, the upper limit of the digging depth 113 is determined based on the soft magnetic under layer thickness 117 and the condition that "magnetized amount of the SPT head<magnetized amount of the under layer flat region".

According to the magnetic recording system using the aforementioned head and media, it has been confirmed that there is an improvement in reproducing signal intensity, overwriting property, off-track property, and the like, by developing concavity and convexity on the soft magnetic under layer 102 in such a manner as synchronize with the period of the recording bit. In the following description, quantitative improvements and effects will be explained.

EXAMPLE 2

Figure 2:
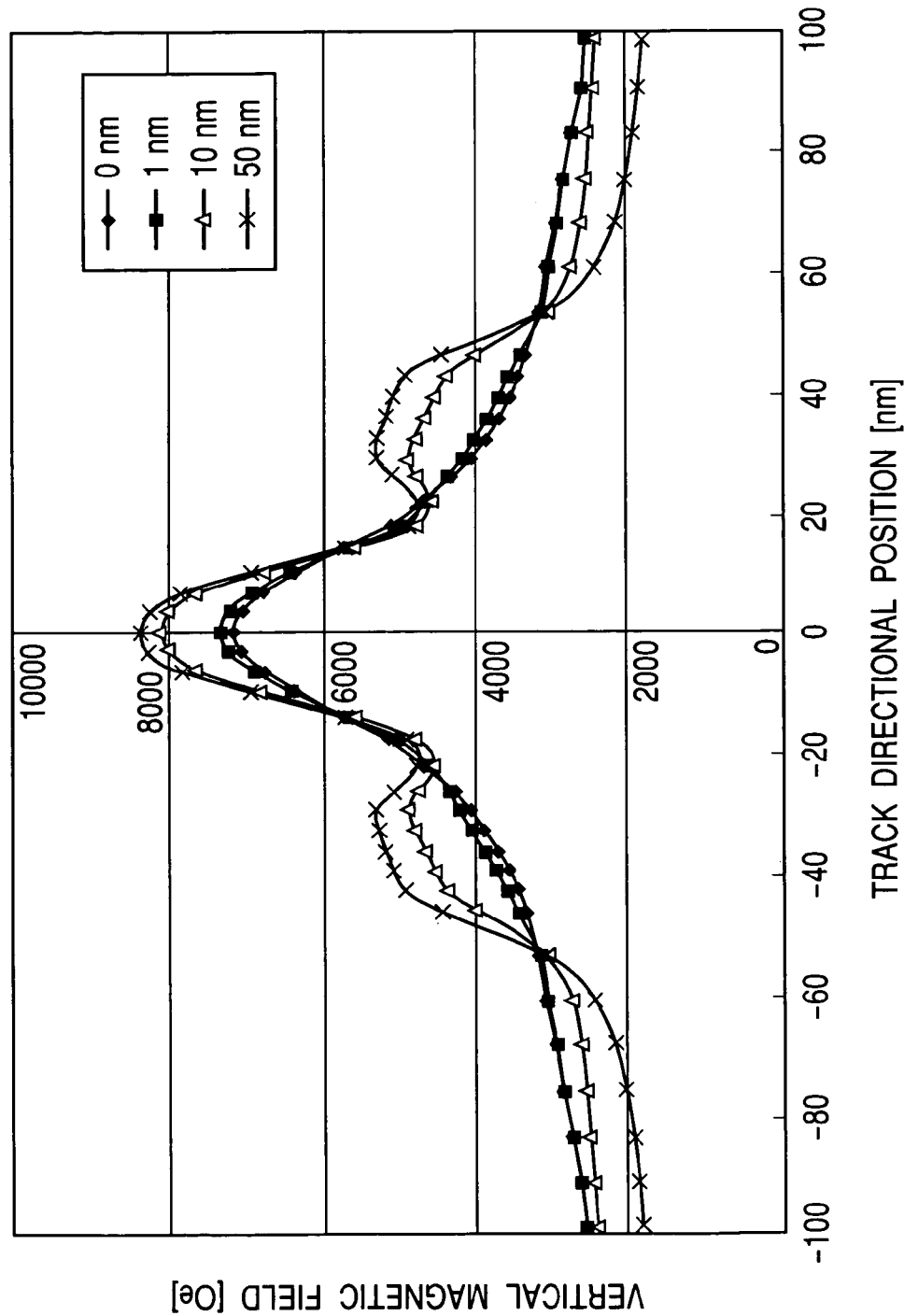
FIG. 2 is a diagram showing one embodiment of the recording media relating to the present invention.

FIG. 2 shows a result of calculation, assuming the horizontal axis as a track directional position and the vertical axis as a vertical substance of the magnetic field generated by the SPT writer 104. In this calculation, the digging depth was changed under the condition that i=1000, where i indicates a relative permeability of the soft magnetic under layer 102, Bs=1.8 T, where Bs indicates a saturation flux density of the SPT writer, the distance 116 between the SPT headland the soft magnetic under layer=18 nm, the track pitch 112=36 nm, the width of magnet 111=20 nm, and magnetomotive force is 0.3 AT. Due to a computer power, the calculation range was limited to the region where the number of magnetic layers is 3×3. Further, since the magnetic permeability of the magnetic layer 103 was sufficiently small comparing to the relative permeability of the soft magnetic under layer 102 as described in the Example 1. Therefore, the effect of the magnetic permeability of the magnetic layer 103 was ignored.

As shown in FIG. 2, it has been found that when the digging depth 113 was zero, that is, there was no digging into the soft magnetic under layer 102, a gentle magnetic field distribution was obtained having the maximum point only just below the center of the SPT writer. On the other hand, when the digging depth 113 was 50 nm, it has been found that the magnetic intensity in the perpendicular direction had its local maximum value corresponding to the location of the recording bit. Further, just below the SPT writer 104, the magnetic field intensity was increased approximately by 17% at the maximum, comparing to the case without any digging depth, even if same materials used and magnetomotive force were used.

In the present calculation, a material having the saturation flux density Bs=1.8 T and the soft magnetic under layer relative permeability i=1000 were used as a pole material. Alternatively, it is possible to use a material having larger saturation flux density (Bs) or a larger relative-permeability so as to obtain larger magnetic field intensity than that of the present calculation result.

EXAMPLE 3

Figure 3:
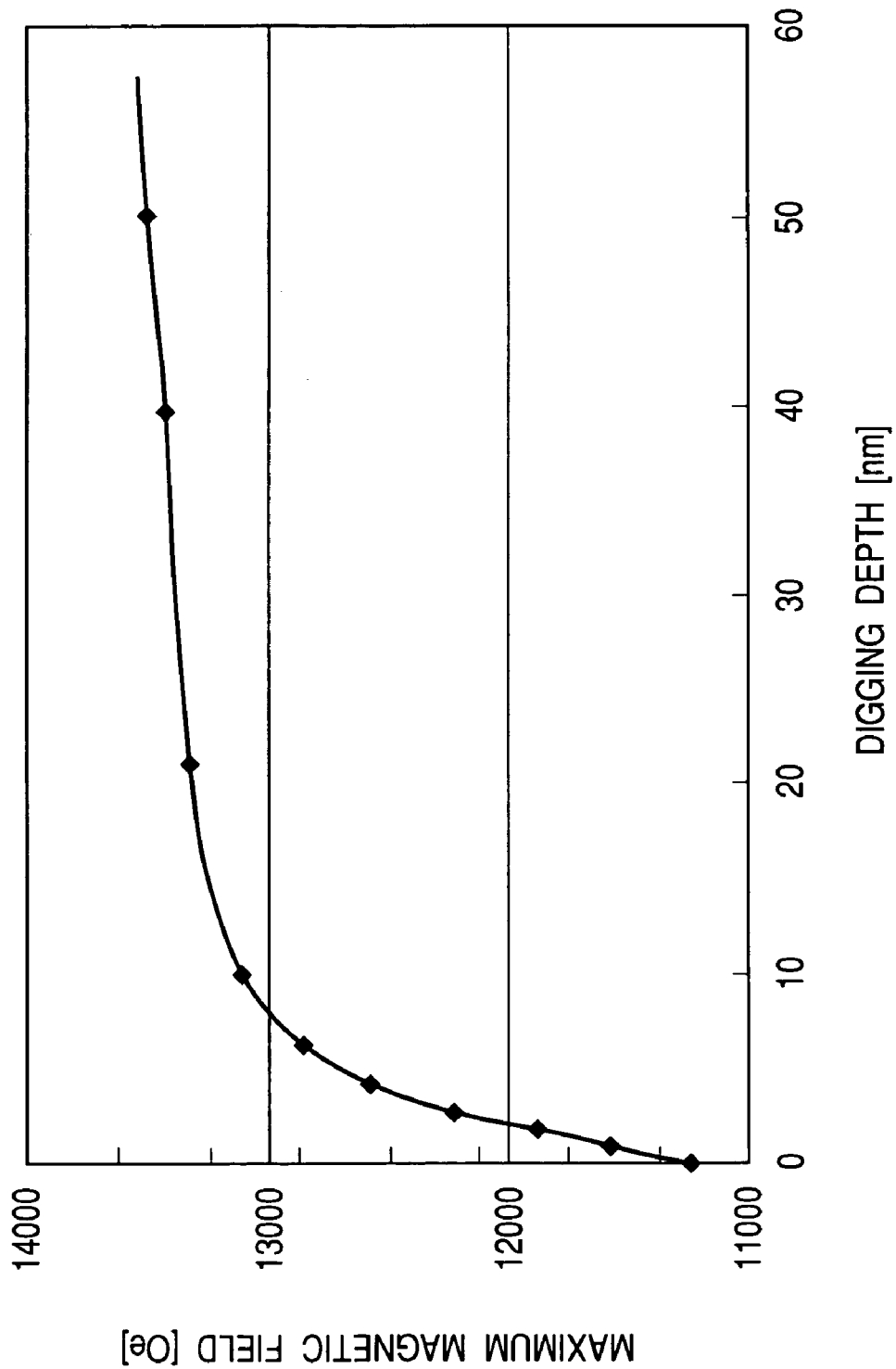
FIG. 3 is a diagram showing one embodiment of the recording media relating to the present invention.

FIG. 3 shows a result of calculation, assuming the horizontal axis as a digging depth and the vertical axis as the maximum magnetic field intensity in the perpendicular direction just below the SPT writer 104. In this calculation, the digging depth was changed under the condition that i=2000, where i indicates the relative permeability of the soft magnetic under layer 102, Bs=2.0 T, where Bs indicates the saturation flux density of the SPT writer, the distance 116 between the SPT head and the soft magnetic under layer=18 nm, the track pitch 112=36 nm, the width of magnet 111=20 nm, and magnetomotive force was 0.3 AT.

As in the case with Example 2, the calculation range was limited to the region where the number of the magnetic layers was 3×3, and the calculation was carried out, ignoring the effect of the magnetic layer 103. It has been found that the intensity of the magnetic field perpendicular substance became higher by increasing the digging depth amount 113 from zero. According to the present invention, it has been found that by carrying out digging into the soft magnetic under layer, the magnetic field intensity applied on the recording bit can be made higher without changing the saturation flux density (Bs) of the main pole material.

In the current magnetic recording system, it is known that a practical limit of the media Hc which can carry out recording actually is approximately 0.6×Bs0, when the main pole material having the saturation flux density Bs0 is employed (e.g., Non-Patent Document 1).

In the present example, since Bs of the main pole material used was 2.0 T, in the conventional magnetic recording system, the upper limit of the media Hc is 0.6×2.0 T=1.2 T as described above. However, in the present example, it has been found that when the digging depth of the under layer was 4.4 nm, the upper limit was exceeded. It is to be noted that a convergence effect of the magnetic flux remarkably increases, if the depth is changed within the range equal to or less than 10 nm. Even if the digging depth is further increased, the convergence effect can be kept increased only slightly. Therefore, under this condition, in order to obtain a sufficient magnetic flux convergence effect, it is required that the digging depth 113 is at least 5 nm, or more preferably, it is to be at least 30 nm where increase of the magnetic field intensity becomes almost saturated.

From a viewpoint of production engineering regarding media creation, it is desirable that the digging depth 113 is smaller. With the combination of the materials and the sizes as used in the present example, a required effect was able to be obtained when the digging depth 113 was equal to or less than 50 nm. Similarly, according to FIG. 3, it has been found that when the digging depth 113 was equal to or more than 3% of the track pitch 112, convergence effect of the magnetic flux became large.

Figure 4:
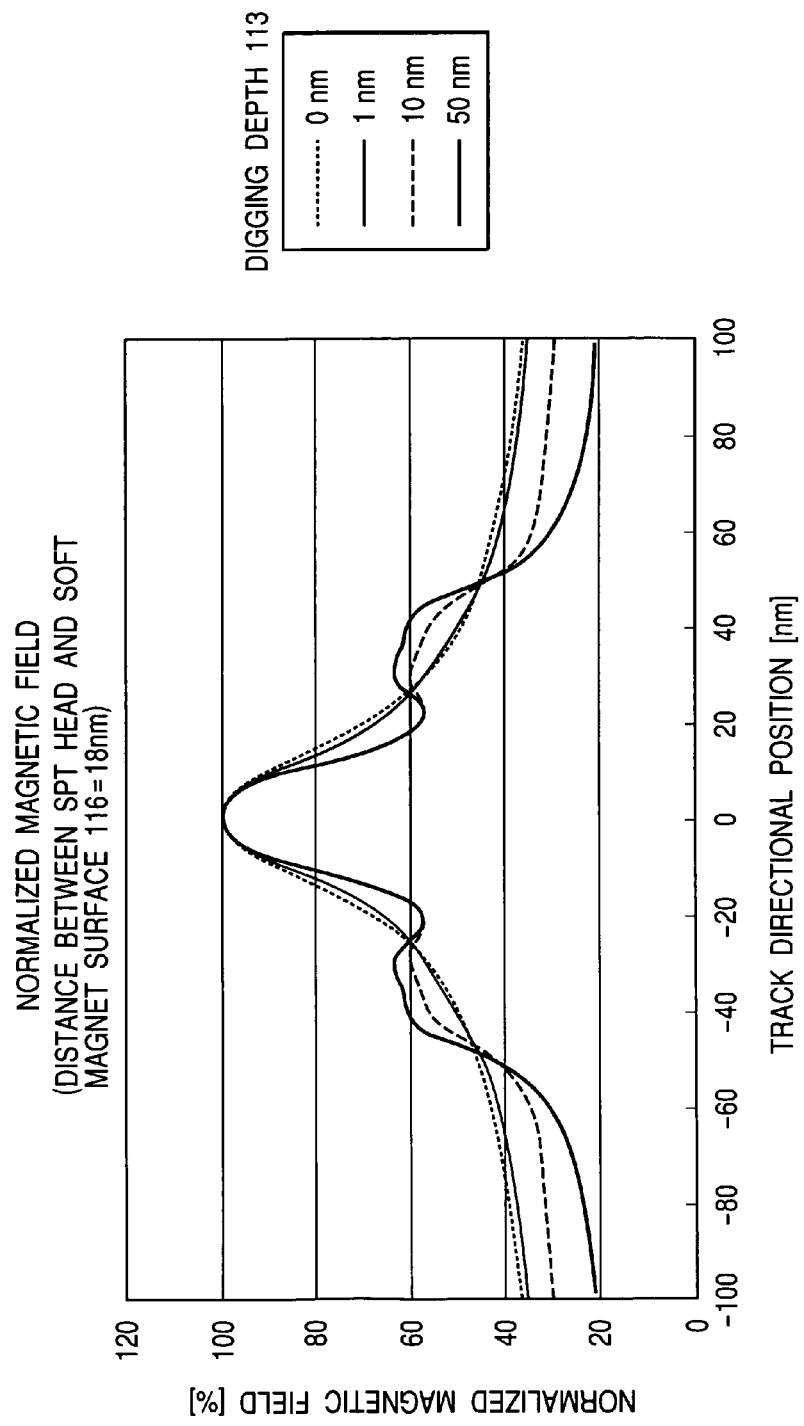
FIG. 4 is a diagram showing one embodiment of the recording media relating to the present invention.

FIG. 4 shows that the magnetic field in the perpendicular direction as shown in FIG. 2 was divided by the maximum magnetic field intensity for each condition, and the obtained results were normalized. Deeper the digging depth 113 was, more steep magnetic field distribution was obtained, and the recording property was more enhanced. However, as the digging depth 113 becomes larger, the convergence effect of the magnetic flux remarkably acts also on the adjacent recording bit, and magnetic flux leakage towards the adjacent recording bit appears on the both shoulders of the recording magnetic field. Therefore, under the condition that the magnetic field at the adjacent recording bit portion is intensified, for example, when the digging depth 113=10 nm, it is necessary to suppress the size dispersion of the magnetic field required for the magnetization reversal of each magnetic particle, within ±20% at the maximum.

Figure 5:
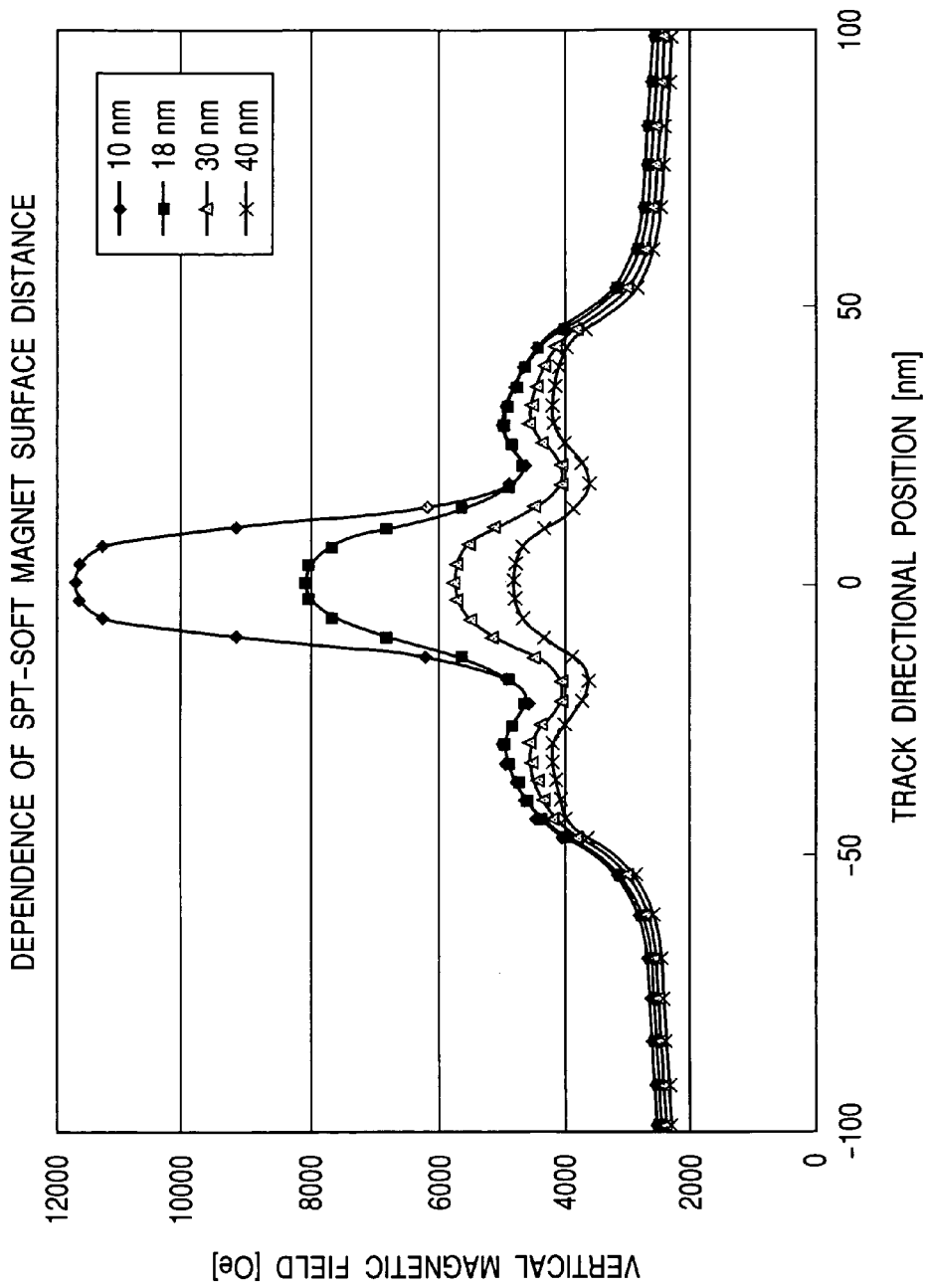
FIG. 5 is a diagram showing one embodiment of the recording media relating to the present invention.

FIG. 5 shows a result of changing the distance between SPT head and soft under layer by fixing the digging depth 113 to 10 nm, using a same configuration as shown in FIG. 2. The vertical axis indicates the intensity of vertical substance of the magnetic field and the horizontal axis indicates the track directional position. According to FIG. 5, it has been found that the smaller is the distance between SPT head and soft magnetic under layer 116, more intensified and steeper distribution of the recording magnetic field can be obtained. Since the magnetic field intensity changes according to a lot of the parameters, when the present embodiment is carried out, it is necessary to determine an appropriate digging depth 113 in accordance with the material and shape of the SPT writer 104, soft magnetic under layer 102 and magnetic layer 103, flying height 115, and a switching field of each magnetic layer.

It is to be noted that in the present example, the magnetic layer 103 is subjected to patterning so that it fits to the concavity and convexity of the surface of the soft magnetic under layer 102. However, a convergence effect of the magnetic flux can be obtained just by giving a patterning on the surface of the soft magnetic under layer, without giving a patterning on the magnetic layer. In this case, though, there is a problem that a media noise may become a little larger due to an influence from a boundary (magnetization transition region) with the adjacent bit, comparing to the case where the patterning is given on the magnetic layer.

Figure 14:
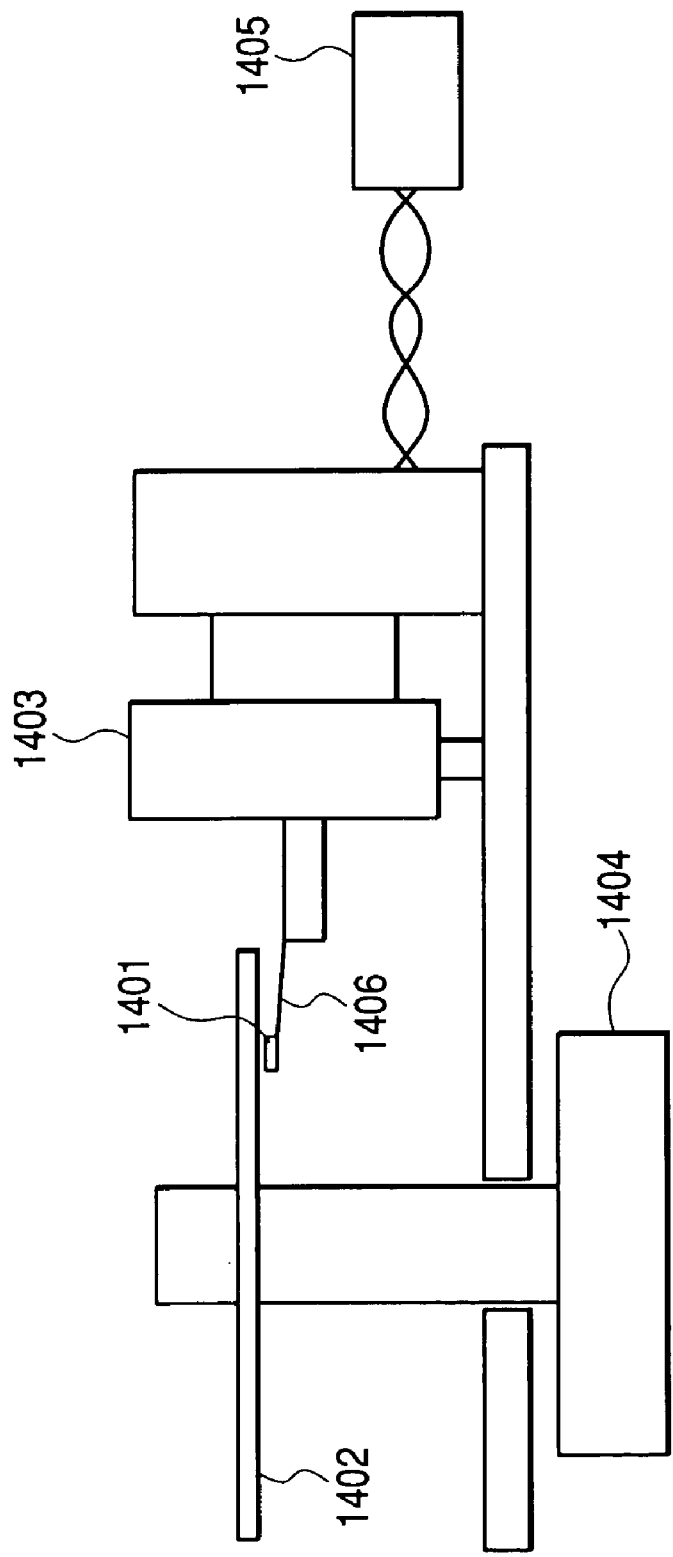
FIG. 14 is a diagram showing a configuration example of the magnetic disk unit on which the recording media of the present invention is mounted.

FIG. 14 is a diagram showing a hard disk system using the media according to the present invention. A SPT writer and GMR device, functioning as a writing head and a reading head respectively, are incorporated in a slider 1401, and the slider 1401 is mounted on the recording media 1402 comprising a glass substrate, soft magnetic under layer, magnetic layer and protective layer. The magnetic recording media 1402 is fixed on a spindle 1404 and is capable of rotary motion. The slider 1401 is connected to an actuator 1403 via gimbals 1406, and the slider 1401 is capable of moving on the disk surface. The slider 1401 receives a buoyant force from a relative movement with the magnetic recording media 1402 and floats on the magnetic recording media 1402.

Figure 15:
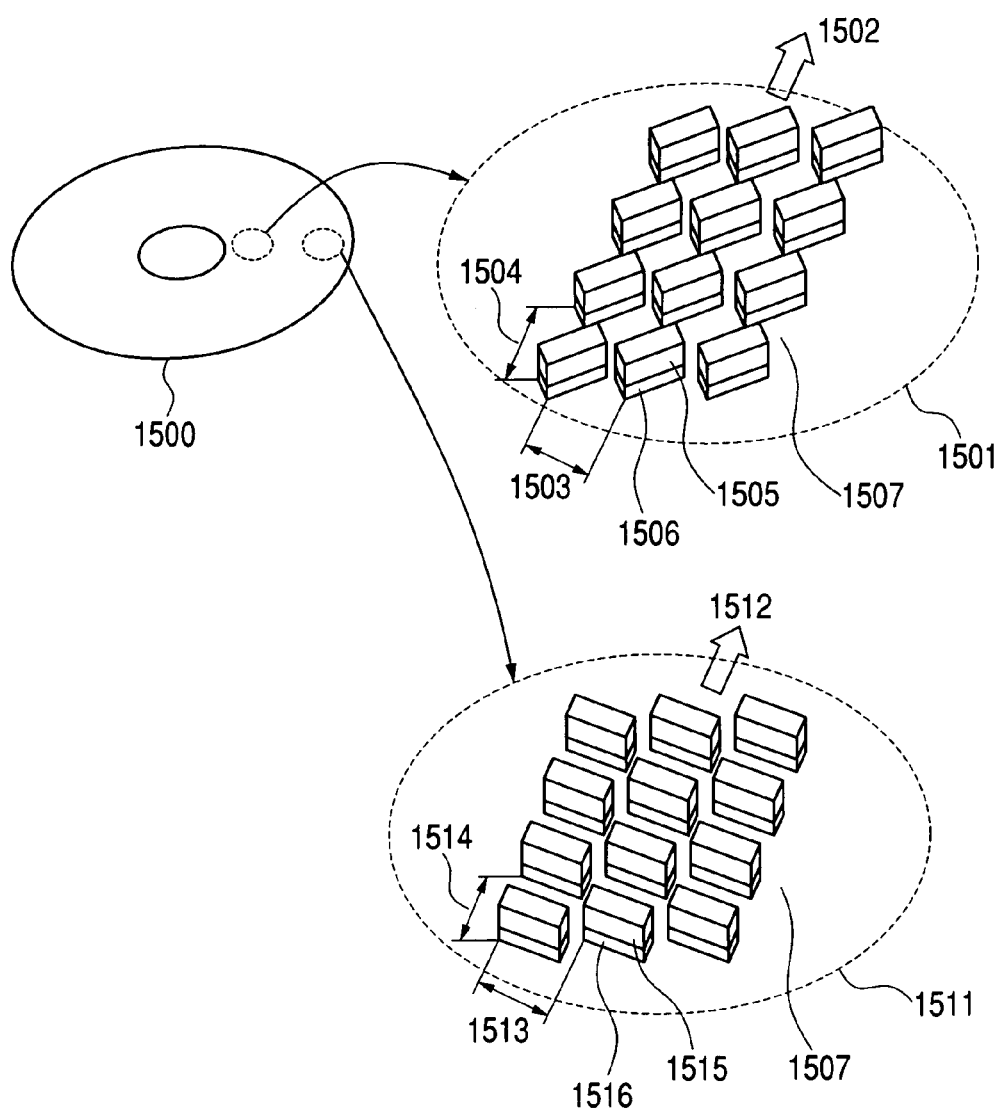
FIG. 15 is a diagram showing a configuration example of the recording media of the present invention.

FIG. 15 is a diagram showing the magnetic recording media used in the present example. Reference numeral 1501 indicates an enlargement of inner region of the disk. A soft magnetic column 1506 and a magnetic material 1505 are formed on the flat region of a soft magnet 1507, regularly and discretely on the circumference, with the track pitch 1503 and the bit period 1504.

Each magnetic particle comprising the soft magnetic column 1506 and the magnetic material 1505 is angled with respect to the head traveling direction 1502 corresponding to a yaw angle caused by a rotary actuator of a head driving mechanism, as shown in the Patent Document 4. This angle is determined according to an angle made by the head traveling direction 1502 and one side of the magnetic material 1505, or in the case of elliptical bit, an angle made by the head traveling direction 1502 and main axis or minor axis of the ellipse. Then, at the time of media creation, the magnetic materials are previously arranged in such an orientation as thus angled.

Therefore, as shown in the enlargement of outer region 1511 of the disk, the angle between each magnetic particle comprising the soft magnetic column 1506 and the magnetic material 1505, and the head traveling direction 1512 varies according to the radial value of the disk. The track pitch 1503 in the inner region of the disk and the track pitch 1513 in the outer region of the disk are both 36 nm in the present example. However, these track pitches may have different values as required.

Further, the bit period 1504 in the inner region of the disk and the bit period 1514 in the outer region of the disk are both 20 nm in the present example. Therefore, in a disk which rotates at a constant angular velocity, a linear velocity of each bit string is different. This is handled by changing a writing and reading frequency. As a matter of course, it may be possible to change the bit period 1504 in the inner region and the bit period 1514 in the outer region of the disk so that the linear velocity becomes constant.

If necessary, the disk is sectioned concentrically into some zones and the magnetic materials are appropriately arranged in each zone, as well as adjusting the read-write speed, so that the linear velocity is made almost constant by zone. It is to be noted that even not illustrated in the enlargement of inner region 1501 and the enlargement of outer region 1511, each space between the magnetic particles is embedded with a non-magnetic material or a material having permeability lower than that of the soft magnetic column 1506, and thus the disk surface is planarized.

In the present example, as a material for embedding the space between the magnetic particles, alumina is used. In order to avoid influence of static electricity, the planarized surface is coated with a conductive lubricant. Materials other than alumina may be used for embedding the space between the magnetic materials, for example, silicon dioxide, metal, organic matter, and so on.

In the present example, it is designed that when the relative velocity between the slider 1401 and the magnetic recording media 1402 is 10 m/s, the slider 1401 floats approximately by 10 nm. The SPT writer and a reading head within the slider 1401 are electrically connected to the signal processing unit 1405, and a write current, a read signal and the like are exchanged. Sliders 1401 are arranged on both sides of the magnetic recording media, though not illustrated, each of the sliders is connected to the signal processing unit 1405. At the time of writing information, it is necessary to precisely recognize a location of each bit and to apply the write current at a required timing.

In order to achieve above, a mechanism shown in the Patent Document 5 was employed. It is to be noted that as the driving mechanism, a mechanism capable of translational motion may be used instead of the spindle 1404, for example, a linear actuator, a piezo actuator and the like. In this case, the magnetic materials are not arranged as explained with FIG. 15, but they may be arranged in an orientation such that each side of the magnetic material (or if it is elliptical, main axis or minor axis of the ellipse) is perpendicular to the track direction and the bit length direction.

EXAMPLE 4

Figure 6:
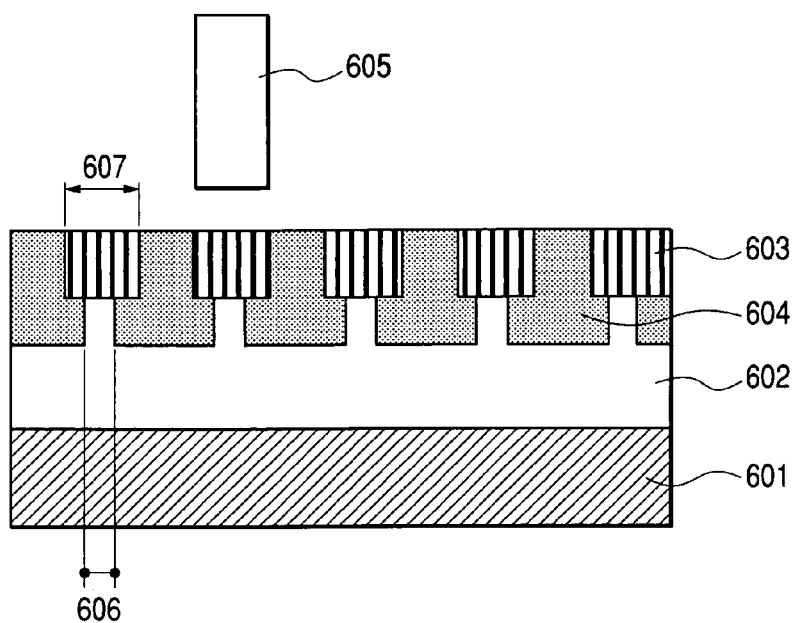
FIG. 6 is a diagram showing one embodiment of the recording media relating to the present invention.

FIG. 6 shows another embodiment of the present invention. In this example, a perpendicular magnetic recording media has a structure that a column on the soft magnetic under layer surface is narrowed, so as to enhance the magnetic flux convergence effect. As with the case of FIG. 1, the soft magnetic under layer 602 and the magnetic layer 603 are arranged on the glass substrate 601. As a material of the magnetic layer 603, a multilayer film of Cobalt/Palladium (Co/Pd) having a perpendicular anisotropy was used in the present example.

If the Co/Pd multilayer film is created perfectly, there is not, in theory, a precipitation of non-magnetic material which cuts off an exchange interaction, within the magnetic particle on which the patterning has been given. In other words, there is a tendency that the magnetic particle easily becomes a single domain in a bit, having a magnetic property suitable for pattern media material, because of increase in unit volume for magnetization reversal, reduction of noise and the like. Tantalum, Palladium and Carbon are used respectively as an adhesive layer, an alignment layer and a lubricant layer, though it is not illustrated.

The column on the soft magnetic under layer surface corresponds to a joint between the soft magnetic under layer 602 and the magnetic layer 603, and reference numeral 607 indicates a part of the magnetic layer which is subjected to patterning, i.e., a recording bit. The cross sectional area of the column is smaller than that of the recording bit and the convergence effect of the magnetic flux is more enhanced comparing to the perpendicular recording media of the Example 1. Here, "cross sectional area of the column" and "cross sectional area of the recording bit" indicate an area when the recording media is cut in parallel with the substrate. Therefore, they may be defined as a projected area to the substrate.

Arrows 606 and 607 in FIG. 6 schematically show the relationship above, and these arrows indicate that the length of the column in the track width direction is shorter than that of the recording bit. Similar relationship is found with regard to the length in the track running direction, though it is not illustrated. It is to be noted that if the diameter 606 of the soft magnetic column is too small, causing a large reluctance and then there is a possibility that recording magnetic field may be lowered.

In the present example, the diameter of soft magnetic column 606 was designed to be 70% of the diameter of magnetic column 607. It is necessary to change the values appropriately according to the write head, soft magnetic under layer permeability, digging depth, and the like. Further, in the present example, the distance between the magnetic columns 607 is embedded with the non-magnetic material 604 so as to avoid that the disk surface unevenness may become an obstacle for allowing the magnetic write head to fly. With this structure, the unevenness on the disk surface becomes 3 nm or less in average and a smooth flying of the write head has been achieved.

In the present example, alumina was used as a non-magnetic material. However, another material may be used as far as a flat surface and sufficient strength can be obtained.

Further, in FIG. 6, the region below the magnetic layer 603 without the soft magnetic under layer 602 is filled with the non-magnetic material 604. However, as far as the media surface is flat, this region is not necessarily embedded with the non-magnetic material. An intermediate layer may be arranged between the soft magnetic under layer 602 and the hard magnetic layer 603 as required, so as to improve a magnetic property, though it is not used in the present example.

Figure 7:
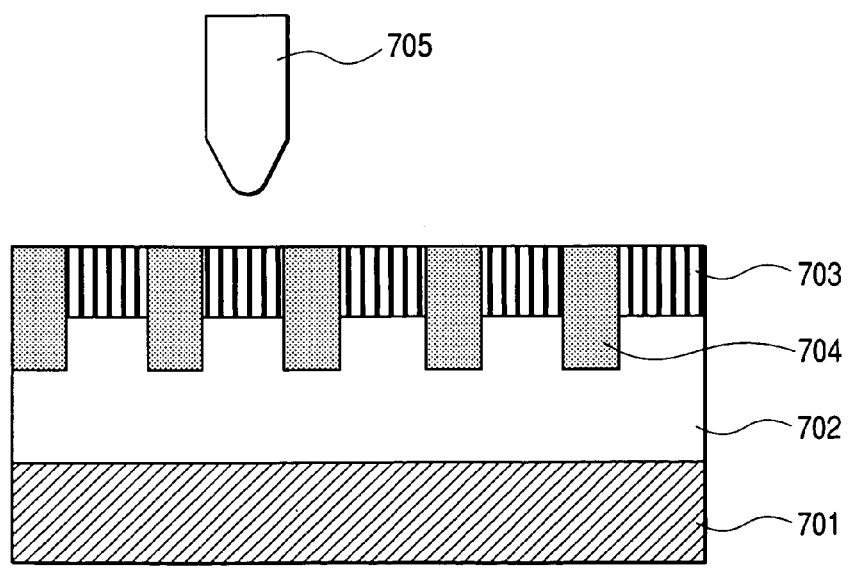
FIG. 7 is a diagram showing one embodiment of the recording media relating to the present invention.

In FIG. 7, an example of the SPT writer in a shape suitable for a perpendicular media used in the present invention is shown together with a recording media. Reference number 705 indicates a main pole of the SPT writer and the edge of the main pole is cut crosswise. In a media of conventional type which has no patterning on the soft magnetic under layer, it has been difficult to implement such a shape of the SPT writer because it may cause non-uniformity of the magnetic field distribution and lowering of the recording magnetic field. However, in the present example, the soft magnetic under layer was processed according to the period of a recording bit and it has become possible to suppress a spread of the magnetic field distribution. Further, it has also become possible to reduce the influence onto the adjacent track, which is shown in FIG. 4.

EXAMPLE 5

Figure 8:
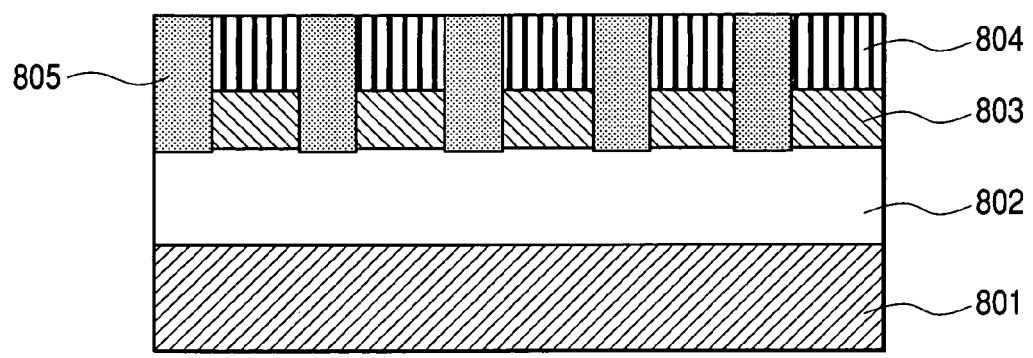
FIG. 8 is a diagram showing one embodiment of the recording media relating to the present invention.

FIG. 8 shows another embodiment of the present invention. The recording media of the present embodiment is a media comprising an under layer surface with a patterning, the column of which is made of a material having a permeability higher than the other region of the under layer. A first soft magnetic under layer 802 functioning as a flat region of the under layer is formed on the glass substrate 801, and in the portion corresponding to a column thereon, a second soft magnetic under layer 803 is formed, which comprises a material having a permeability higher than that of the first soft magnetic under layer 802.

Reference number 804 is a magnetic layer and a patterning is given thereon. Reference number 805 indicates a non-magnetic layer to fill the space between the-magnetic layer with patterning and the second soft magnetic under layer. The second soft magnetic under layer 803 exists only just below the recording bit, aiming at effectively attracting the magnetic flux which has been generated at the write head. Therefore, in a static state, the second soft magnetic under layer 803 is constantly in a magnetized state oriented to a same direction as that of the magnetic layer 804.

In other words, as for the second soft magnetic under layer, it is not necessary to consider a noise caused by this layer, it has a wider range of material choices comparing to the first soft magnetic under layer, and thus a material having a high permeability can be selected. Then, by using a soft magnetic under layer comprising a plurality of layers, it is possible to reduce a reluctance, comparing to the unevenness generated by a single soft magnetic under layer, and thus an effect for converging the magnetic flux from the write head can be enhanced. Therefore, it is possible to enlarge the recording magnetic field and to obtain a steeper magnetic field distribution.

In the present example, the patterning is given so that the cross sectional areas of the second soft magnetic under layer 803 and the hard magnetic layer 804 are same. However, as shown in FIG. 6, the convergence effect can be more enhanced when the area sizes are different. It is to be noted here that if a diameter of the soft magnetic column 606 is too small, the magnetic flux may be saturated in this region. Therefore, it is necessary to select the diameter of the soft magnetic column 606 within a range that the magnetic flux is not saturated.

As described above, if at least two types of soft magnets are laminated and a material having a large saturation flux density for the column is selected, even a narrowed portion is hardly saturated. Therefore, it is possible to select a smaller diameter for the soft magnetic column 606. In this Figure, the digging depth of the soft magnetic under layer and the thickness of the soft magnetic under layer 704 having a high saturation flux density are same, but the thickness of the soft magnetic under layer having a high saturation flux density can be more or less than the digging depth of the soft magnetic under layer. Further in FIG. 8, the materials having a different saturation flux density form two layers only, but three layers or more may be possible as required.

EXAMPLE 6

Figure 9:
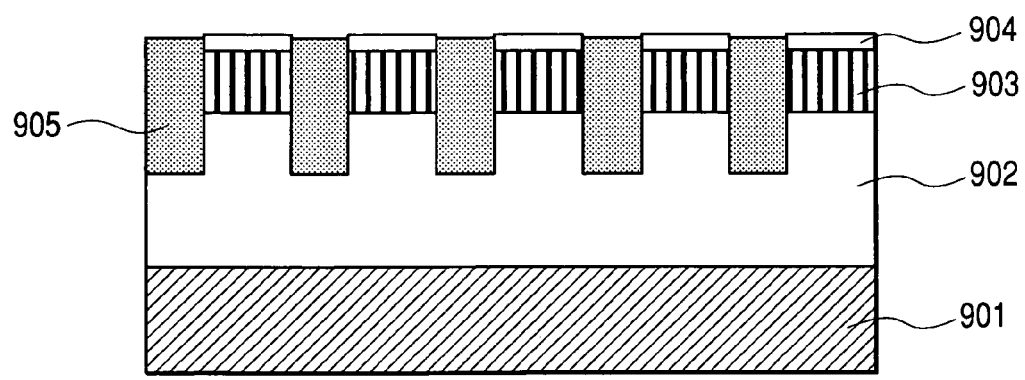
FIG. 9 is a diagram showing one embodiment of the recording media relating to the present invention.

FIG. 9 is a diagram showing a cross sectional view of the media depicting another embodiment of the present invention. A soft magnetic under layer 902 and a hard magnetic layer 903 having a perpendicular anisotropy are arranged on a glass substrate 901. A soft magnetic layer 904 is further disposed on the magnetic layer 903.

In the present example, the thickness of the soft magnetic layer 904 is assumed to be 1 nm. In a conventional continuous media, putting the soft magnetic layer on the hard magnetic layer caused a magnetic flux from the write head to pass along the film in-plane, and thus affecting adversely on a recording property. In the present invention, since the soft magnetic layer 904 is discontinuous and discrete in the film in-plane direction, the magnetic flux absorbed into the soft magnetic layer 904 passes through the hard magnetic layer 903 and reaches the soft magnetic under layer 902. With a structure as shown in FIG. 9, it is possible to shorten a distance between the SPT writer and the soft magnetic layer, and then, the magnetic flux is effectively converged and a large recording magnetic field can be obtained.

Figure 10:
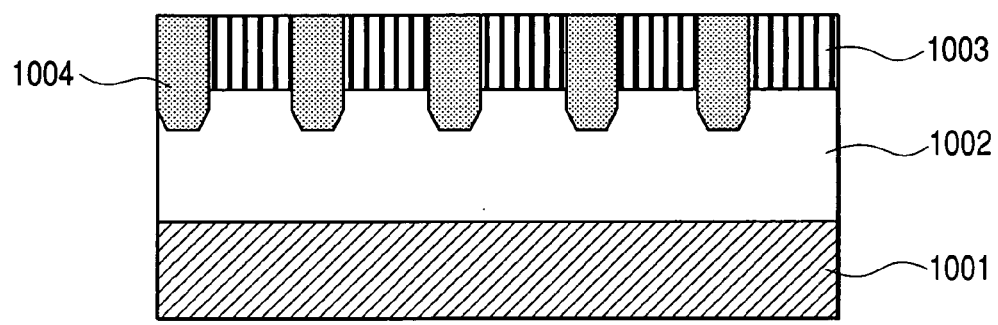
FIG. 10 is a diagram showing one embodiment of the recording media relating to the present invention.

FIG. 10 is a cross-sectional diagram of a recording media showing another embodiment of the present invention. A soft magnetic under layer 1002 and a hard magnetic layer 1003 having a perpendicular anisotropy are arranged on a glass substrate 1001. The digging into the soft magnetic under layer 1002 has a curved surface. The distance between the magnetic layers 1003 is embedded with a non-magnetic material 1004 and the surface is planarized. In the present example, since the concave portion in the soft magnetic under layer has a shape of curved surface, it is possible to prevent the magnetic flux generated from the SPT writer from converging to the edges of the soft magnetic under layer concave portion. Therefore, it is possible to allow the magnetic flux to converge efficiently to the magnetic layer 1003 by making the edges of the concave portion such a curved surface shape.

Figure 11:
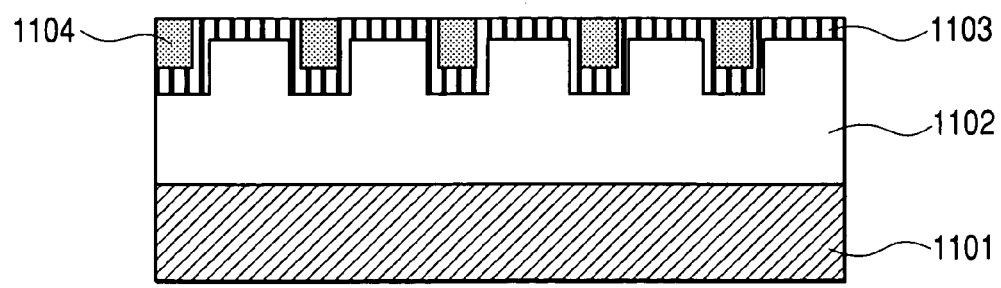
FIG. 11 is a diagram showing one embodiment of the recording media relating to the present invention.

FIG. 11 is a cross sectional diagram of the recording media showing another embodiment of the present invention. A soft magnetic under layer 1102 is disposed on the aluminum substrate 1101, and the soft magnetic under layer 1102 is subjected to patterning with columns, each 90 nm×20 nm, in a period of 100 nm in the track width direction and in a period of 25 nm in the bit length direction. A hard magnet 1103 is attached thereon. Differently from the magnetic recording media as describe in the above embodiment, the hard magnet 1103 is also deposited on the concave portion of the soft magnetic under layer 1102. In addition, there may be a case where the hard magnet 1103 is attached to the side surface of the soft magnetic under layer 1102.

The concave portion of the hard magnet 1103 is embedded with the non-magnetic material 1104, and the surface is planarized. As a material for embedding the concave portion, alumina, silicon dioxide, organic matter, metal or the like may be used. As far as there is not a particular problem in a property at reading, a magnetic material may be used instead of the non-magnetic material. Information recording is carried out only onto the hard magnet on the column of the soft magnetic under layer 1102. This kind of media structure can be achieved by creating the concavity and convexity structure of the soft magnetic under layer 1102, and subsequently by depositing the hard magnet 1103 thereon by sputtering. Therefore, there are found features that a media production process is quite simple, and also magnetic properties of the hard magnet 1103 can be controlled easily.

EXAMPLE 7

Figure 12:
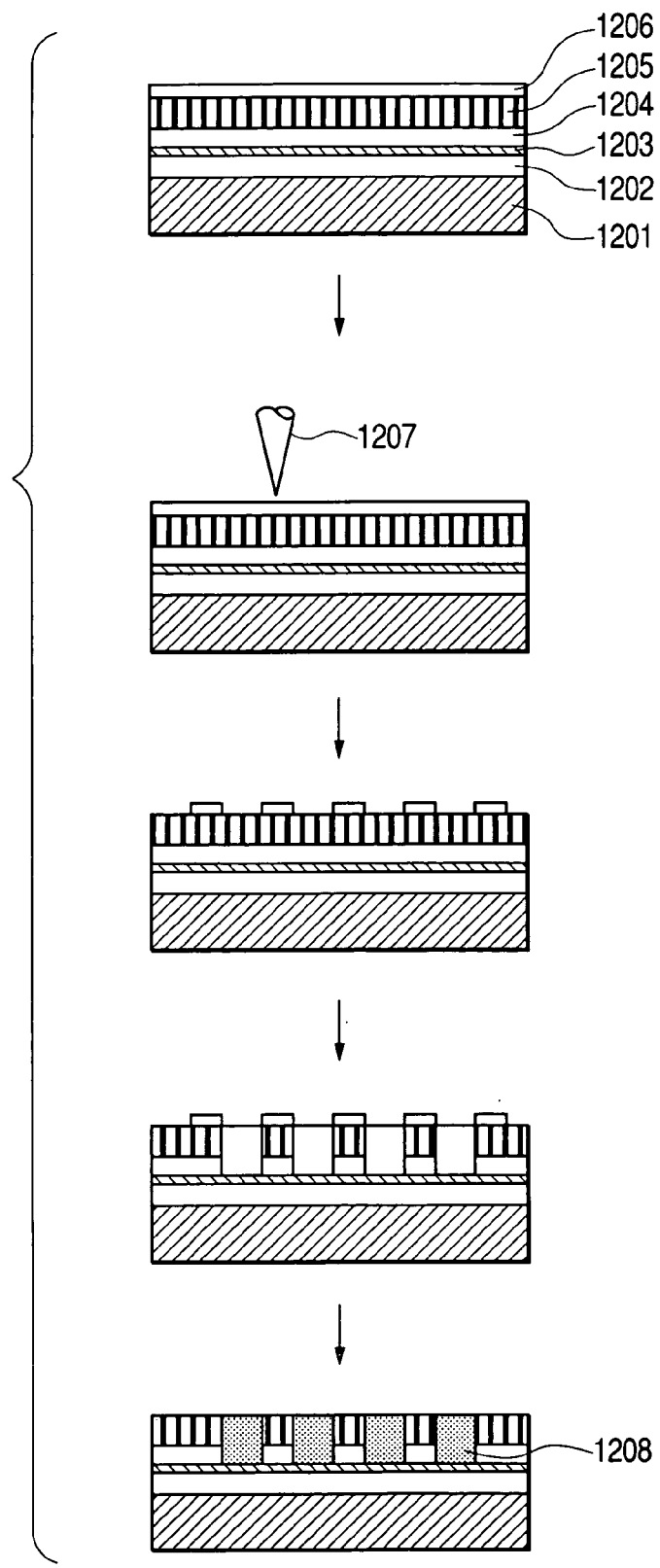
FIG. 12 is a diagram showing one embodiment of a method for forming-the recording media of the present invention.

FIG. 12 shows a method for forming the recording media relating to one embodiment of the present invention. A glass substrate 1201 is put into a vacuum chamber, and by sputtering, a soft magnetic under layer 1202, a detect layer 1203 also serving as an etching stopper layer, a soft magnetic under layer 1204, and a hard magnet 1205 are deposited on the glass substrate 1201. The material of the soft magnetic under layer 1204 and that of the soft magnetic under layer 1202 may be same or not. If a material used for the soft magnetic under layer 1204 has a relative permeability higher than that of the soft magnetic under layer 1202, the media as described with FIG. 8 will be obtained.

In the present example, Cobalt Tantalum Zirconium ($Co_{92}Ta_3Zr_5$) alloy with a relative permeability of ~250, Iron Nickel Molybdenum ($Fe_{17}Ni_{79}Mo_4$) alloy with a relative permeability of ~20000, Gold (Au) with a film thickness of 0.2 nm, Terbium Iron Cobalt (TbFeCo) alloy having a film thickness of 15 nm and perpendicular anisotropy were used respectively for the first soft magnetic under layer 1202, the second soft magnetic under layer 1204, the detect layer 1203, and the hard magnet 1205. The TbFeCo is an amorphous alloy, being different from CoCrPt, and there is no precipitation of the non-magnetic material within the magnetic particle after patterning. That is, TbFeCo has a tendency to easily become a single domain, because the orientation of magnetization within the bit can easily become uniform by an exchange interaction. Further, TbFeCo has magnetic properties suitable for a pattern media material, such as an increase in unit volume of magnetization reversal, reduction of noise and the like.

An adhesive layer comprising Chrome (Cr) was deposited by sputtering between the substrate 1201 and the soft magnetic under layer 1202, and an alignment layer was deposited by sputtering between the soft magnetic under layer 1204 and the hard magnet 1205, though they are not illustrated in the Figure. Further, if a soft magnetic under layer is further attached onto the hard magnet 1205, a media as described in FIG. 9 can be obtained. In addition, a protective layer or a lubricant layer may be attached to the media surface as required.

After a growth of necessary layers, a resist 1206 to be exposed to an electron beam was spin-coated at 2000 rpm on the surface of the hard magnet 1205, so that the film thickness became 100 nm. For a film thickness of the resist, an appropriate amount is selected according to a plotting size, milling size and the like. After the resist is coated, a pre-bake according to the resist property is carried out as required.

It is to be noted that in the present example, a negative resist was used, but a positive resist is also available instead of the negative resist, by changing the plotting pattern. This media sample was put into an electron beam plotting machine, and plotting was carried out by the electron beam 1207 finely narrowed, so that a pattern with a period of 36 nm was formed. Since this pattern period determines a recording density, a required plotting size is to be selected according to the recording density. After the plotting, the sample is taken out, and post-baking is carried out as required.

As for the resist used in this example, the post-baking was not carried out. Subsequently, the plotting pattern was developed, and a periodic structure of the resist was completed. It is to be noted here that if a so-called imprint method is available, this method is preferable to reduce the cost. In the imprint method, a previously created mold is used instead of the electron beam plotting, and it is pressed onto the resist which has been softened by heat, light or a chemical means.

With the resist using as a mask, the media sample is subjected to milling with Argon ion, perpendicularly from upper side, and then a magnetic material allay is completed. Other than the Argon ion milling, milling by another noble gas, or etching by reactive gas (RIE) may be employed. During the milling, a mass spectrometry as to a secondary ion or a secondary neutral particle is conducted by a quadruple mass spectrometer, and the milling is stopped by a signal as a trigger, indicating that a material in the detect layer has been detected.

Instead of the mass spectrometry, any other method may be employed, as far as an elemental analysis of the secondary particle can be conducted by the method. Even after the element is detected in the detect layer 1203, the milling may be continued as required, in such a case where there is in-plane distribution in the milling rate. A required depth is determined by the theory as explained above with FIG. 2, since various factors such as a material permeability, a period of magnetic material are relating to the depth. Further, if a material having a lower Argon gas milling rate, for example Tantalum, is used in the detect layer 1203, instead of Gold, this layer is given a resistance to the milling, and then it can be used as a stop layer. If the stop layer is used, a sample can be created by a system and a process without the mass spectrometry, and thus simplification and power-saving are possible.

Since the detect layer 1203 or the stop layer affects the magnetic property, it is desirable that these layers are made as thin as possible within a range where the object of the present invention can be achieved. However, if the detect layer 1203 contains sufficient amount of elements with which a difference from the soft magnetic under layer 1204 can be detected by the mass spectrometry of the secondary particle, there is no restriction for the material of the detect layer 1203. As a matter of course, the detect layer 1203 itself can be a soft magnetic under layer. In this case, the detect layer 1203 can be made thicker as far as there is no problem in a read-write property.

If the milling rate is previously known and the milling amount can be controlled according to the length of time, it is not necessary to provide the detect layer 1203. Further, in the process as described above, wet etching in solution may be available instead of the ion milling or the reactive ion etching. In this case, it is desirable to introduce the stop layer instead of the detect layer 1203.

Non-magnetic material 1208 is embedded into a concave portion created by milling-or etching, so as to make the surface flat. In the present example, as the non-magnetic material 1208, a spin-on-glass was embedded by spin coating, but another material may be used. Further, the concave portion may be left as it is without embedded, if the unevenness on the media surface or the width of the concave portion is sufficiently small and it may not cause a problem in floating of the write head. If smoothing of the surface is necessary, it is carried out by mechanical polishing, chemical mechanical polishing or the like.

After the surface is planarized, in the present example, the sample is heated up to 300° C. by a lamp heater, so as to improve magnetic properties. By conducting field cooling, easy axes of magnetization are arranged in a radial direction (e.g., Tanahashi et al., JAP 91 (2002) p. 8049).

Further, as required, the utmost surface is attached with a protective layer or a lubricant layer, ant then a recording media is completed. The soft magnetic under layer having a concave portion of curved-surface shape, which has been explained above with reference to FIG. 10, can be produced by using an appropriate milling or etching condition during the above process. As a way of example, in a producing process by Argon ion milling, it was possible to produce a media having a concave portion of curved-surface shape by increasing the Argon gas pressure and decreasing the accelerating voltage.

EXAMPLE 8

Figure 13:
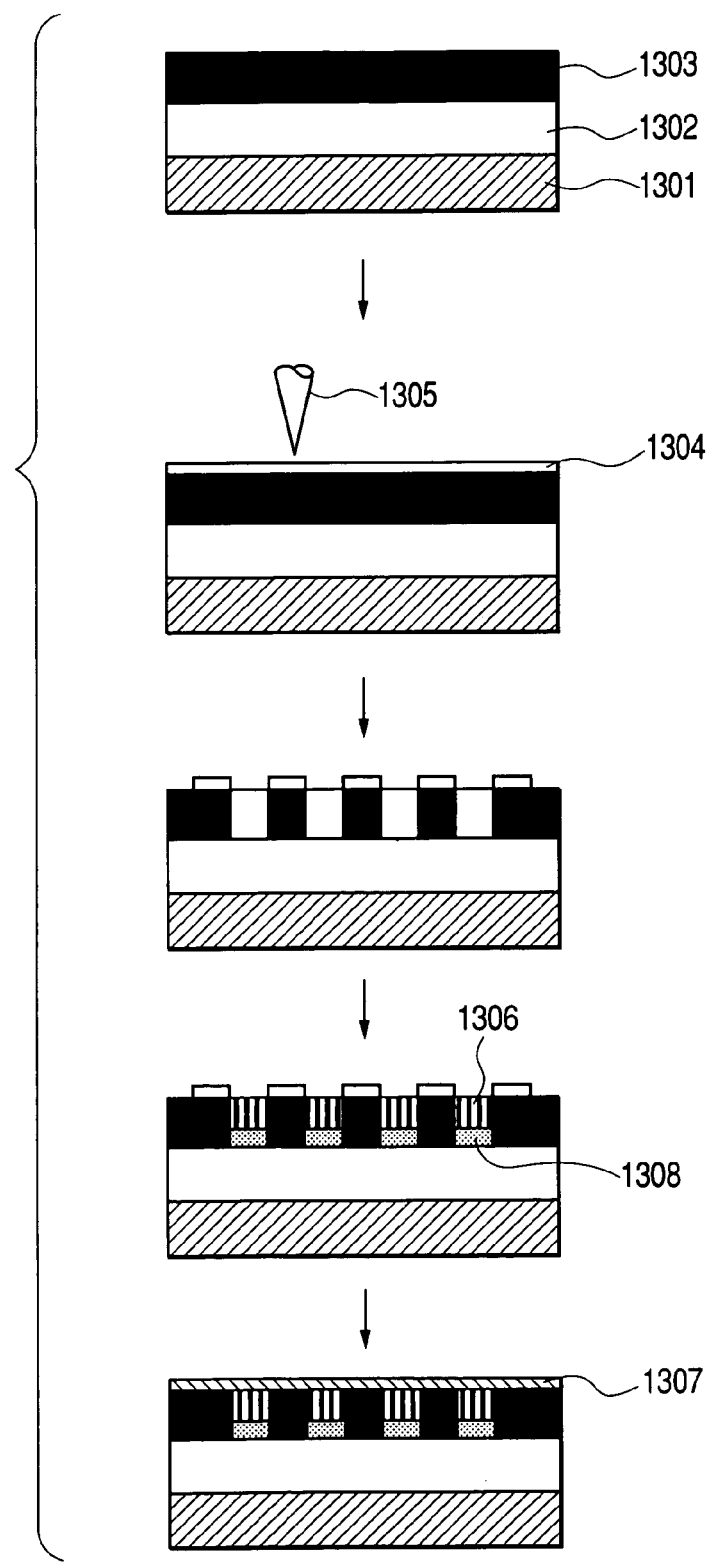
FIG. 13 is a diagram showing one embodiment of a method for forming the recording media of the present invention.

In FIG. 12, an array of magnetic substance was obtained by giving a patterning on the film of the magnetic substance. On the contrary, it is possible to give a patterning on the non-magnetic substance. An example according to such method is schematically shown in FIG. 13. The soft magnetic under layer 1302 and the non-magnetic material 1303 are allowed to grow on the glass substrate 1301 by sputtering. In the present example, alumina was used as the non-magnetic material 1303, but another material such as silicon, silicon dioxide and aluminum, which does not show a hard magnetism, may be used. Further, there exist an adhesive layer between the substrate 1301 and the soft magnetic under layer 1302 for improving the adhesivity therebetween, and a foundation layer for improving magnetic properties, and the like, though they are not illustrated in the Figure.

The resist 1304 is spin coated on the disk surface, and a pattern plotting by the electron beam 1305 was carried out. After the plotting, post-baking and development were conducted, and a pattern structure of the resist was obtained. As a matter of course, it is possible to employ the imprint method as described above. Using the resist as a mask, the non-magnetic material 1303 was subjected to a patterning. In the present example, patterning was carried out by use of Argon ion milling.

During the milling, an element contained in the soft magnetic under layer 1302 was monitored by the secondary ion mass spectrometer, and end-point detection was performed. It is to be noted that some non-magnetic substance 1303 may be left without completely removed, as far as necessary magnetic-properties can be obtained.

Further, instead of Argon ion milling, it is possible to employ another method, enabling a micro-fabrication, such as reactive ion etching, wet etching and the like. In particular, if the reactive ion etching is employed, the soft magnetic under layer 1302 serves as a stop layer, by using a gas having a large selection ratio of the soft magnetic under layer 1302 and the non-magnetic material 1303 as an etching gas. Therefore, the end-point detection by the secondary ion mass spectrometer is not necessary.

As described above, an array of holes of the non-magnetic material 1303 is completed on the soft magnetic under layer 1302. In the array of holes, the soft magnet 1308 and the magnetic material 1306 having a perpendicular anisotropy are sequentially allowed to grow by sputtering or plating. In the case of sputtering, it is desirable that a sputtering apparatus is long-through type, so that the holes are filled with the soft magnet 1308 and the magnetic material 1306 to the bottom.

In the case of plating, it is possible to use the soft magnetic under layer 1302 as an electrode. It is also possible to previously put a film of chemically stable material, such as Gold, between the soft magnetic under layer 1302 and the non-magnetic material 1303, as far as magnetic properties required for reading and writing can be obtained. Subsequently, the surface thereof is subjected to polishing and the protective layer 1307 is allowed to grow thereon. It is also possible to add a lubricant layer or the like on the surface as required.

According to the method above, it is possible to produce a periodic structure of the soft magnet 1308 and the magnetic material 1306 on the soft magnetic under layer 1302. In the present method, as explained in the Example 5, at least two types of soft magnets having different magnetic properties can be disposed below the magnetic material 1306. Here, it is not essential that the magnetic property of the soft magnetic under layer 1302 and that of the soft magnet 1308 are different from each other.

EXAMPLE 9

Figure 16:
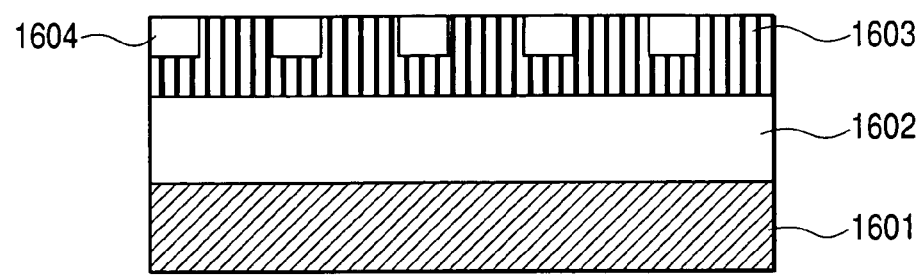
FIG. 16 is a diagram showing a configuration example of the recording media of the present invention.

FIG. 16 is a cross sectional diagram showing another embodiment of the present invention. 200 nm soft magnet 1602 is allowed to grow, as an under layer on the glass substrate 1601 by sputtering method. A hard magnet 1603 having a perpendicular anisotropy comprising CoCrPt is disposed. On the hard magnet 1603, concave portions having a period of 25 nm both in the track width direction and in the bit length direction are provided, and soft magnet 1604 is embedded in the concave portions, which comprises a material having a high permeability.

Figure 17:
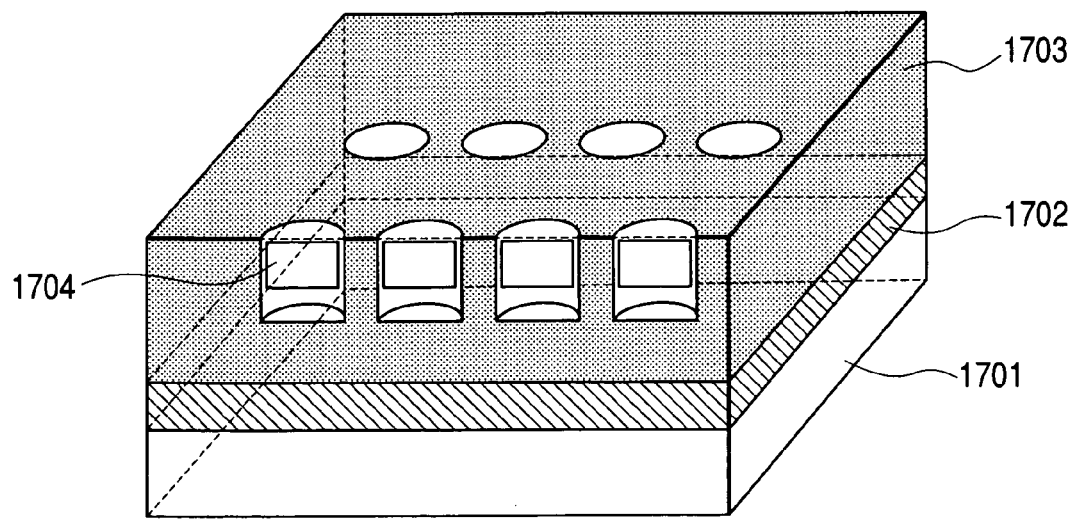
FIG. 17 is a diagram showing a configuration example of the recording media of the present invention.

The surface thereof is planarized to a degree not to influence the floating of the head. Below the soft magnet 1602 and the hard magnet 1603, layers for improving their magnetic properties respectively are provided. Further, on the surfaces, there are a protective layer and a lubricant layer. Each layer may not be limited to one layer, and may comprise some layers. FIG. 17 is an illustration showing FIG. 16 three dimensionally. The soft magnet 1704 having a high permeability, which is arranged in a concave portion of the hard magnet 1702, has a shape of elliptic cylinder. In the present example, the main axis of the ellipse corresponds to the track width direction and the minor axis corresponds to the bit length direction.

It is to be noted the shape of the hard magnet is not necessarily the elliptic cylinder. It may be a circular cylinder, a quadratic prism, or another columnar shape as required. In the present example, recoding was carried out by performing x-y scanning, instead of rotating the media on the spindle.

The magnetic flux generated from the write head is absorbed in the soft magnet 1604 (1704) having a high permeability, and it passes through the hard magnet 1603 (1703) as it is, and reaches the soft magnet 1602 (1702). In other words, the recorded information is preserved as a magnetization orientation of the hard magnet 1603 (1703) just below the soft magnet 1604 (1704) which is discretely provided. The soft-magnet 1604 (1704) has a higher saturation flux density comparing to the hard magnet 1603 (1703), allowing more magnetic flux to pass through, and the soft magnet is in contact with the hard magnet. With the two characteristic points above, it is possible to apply much larger recording magnetic field can be obtained, comparing to a conventional magnetic recording method in which a write head and a recording layer are isolated by a head-media spacing, which comprises airspace, lubricant, a protective layer and the like.

The recorded information is preserved as a magnetization orientation of the hard magnet 1603 (1703) just below the soft magnet 1604 (1704), and on the contrary, at the time of reading, the magnetic field generated by the magnetization is detected by the read head through the soft magnet 1603 (1703).

EXAMPLE 10

Figure 18:
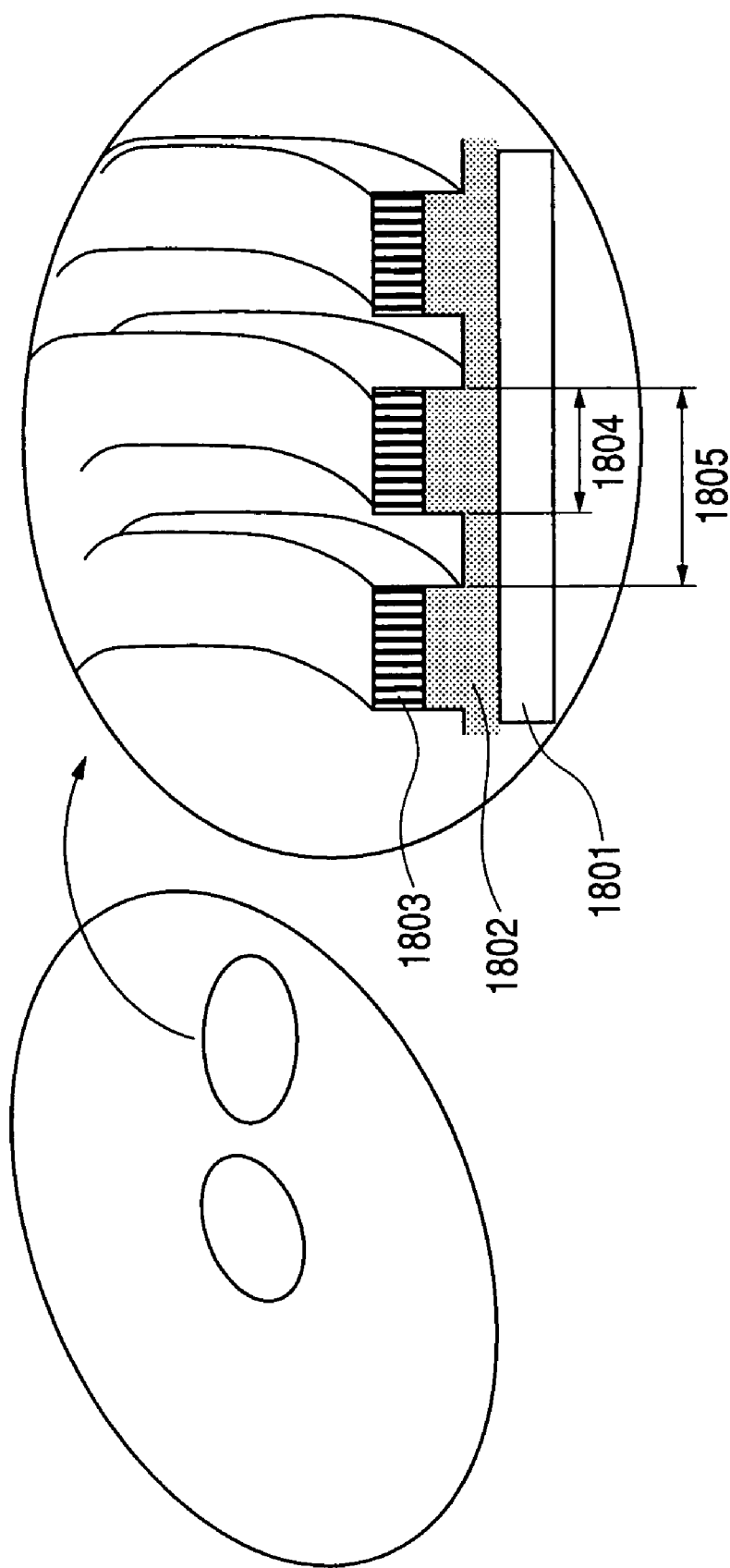
FIG. 18 is a diagram showing a configuration example of the recording media of the present invention.

In the present example, the cross sectional shape is similar to that of FIG. 1, but it features that the columns are continuous with respect to the sheet face perpendicular direction, that is, in the bit length direction. In other words, the present example features that the column comprising a magnetic material and a soft magnet are formed on the disk concentrically with a central focus on the disk center. FIG. 18 is a diagram showing the present example.

In the present example, a soft magnetic under layer 1802 comprising a high-permeability material and a hard magnetic layer 1803 are formed on an aluminum substrate 1801. According to the method as described above, the hard magnetic layer 1803 and the soft magnetic layer 1802 are subjected to a patterning so that the hard magnetic width 1804 becomes 20 nm and the track pitch 1805 becomes 30 nm. Though it is not illustrated, the concave portion (distance) between the recording tracks which comprise the hard magnet and the soft magnet column is embedded with aluminum and the surface thereof is planarized so as not to be a disadvantage for the floating of the head.

Further, a protective film, a lubricant film and the like are disposed on the surface. On each layer, a foundation layer and the like for obtaining required magnetic properties are disposed. A region on the disk necessary for writing the tracking information and the like is secured on the disk.

Since the media of the present example has a continuous surface in the bit length direction, generating approximately same magnetic field distribution as a conventional media, and thus a particular magnetic flux converging effect is not obtained during the writing operation. However, as for the track width direction, there is a concavity and convexity on the soft magnet 1802, and thus the magnetic flux effect can be obtained. In other words, also in the present example, comparing to the continuous media, it is possible to obtain effects such as increase of recording magnetic field, reduction of blots in writing, and improvement of the track property.

Since there is no patterning in the bit length direction in the present example, production of the media is easier than the media of Example 3. Further, the present example has an advantage that a phase-coherency in reading and writing (e.g., see Japanese Patent Application Laid-Open Publication No. 2001-110001) employed in Example 3 is not necessary. On the other hand, in the present example, since it is not possible to give the media a bit shape corresponding to the head yaw angle, which is employed in Example 3 as shown in FIG. 15, it is desirable to employ a method where a shape of flying surface of the write head is made to be a pentagon or an inverted trapezium (e.g., Patent Document 6, Patent Document 7).

However, comparing to a continuous media, there is a non-magnetic material between the tracks, and thus it is possible to suppress the impact on the adjacent track due to the yaw angle to a smaller scale. Therefore, the head shape as described above is not necessarily required. Further, the magnetic flux convergence effect becomes smaller comparing to the case where there is a patterning in the bit length direction.

According to the recoding media of the present invention, it is possible to allow the recording magnetic field generated by a write head to converge and to apply a larger recording magnetic field on each recording bit. Therefore, recording on a material having a large anisotropic constant, which has not been able to be employed as a magnetic recording media conventionally, is now possible and a media which is resistant to a disturbance due to thermal fluctuation and the like can be obtained. Therefore, according to the present invention, a high density magnetic recording media and a high density magnetic recording system can be implemented.

What is claimed is:

1. A perpendicular magnetic recording media having a substrate, a soft first magnetic layer formed on the substrate, and a hard second magnetic layer formed on the first magnetic layer, wherein, the first magnetic layer comprises a plurality of columns which configure a plurality of tracks disposed in discrete manner from each other, have a permeability higher than that of the second magnetic layer and which allow magnetic flux from a magnetic head to converge, and a flat region which magnetically couples the plurality of columns so as to configure a magnetic path which refluxes to the magnetic head the magnetic flux thus converged into the columns, a length of the first magnetic layer column in a track width direction is not more than a bit length of the second magnetic layer in the track width direction, and a length of the first magnetic layer column in a bit length direction is not more than the bit length of the second magnetic layer in the bit length direction.

2. A magnetic recording media according to claim 1, wherein, the tracks are configured by a plurality of columns arranged regularly and discretely in an elongated direction, so that a code array is configured, which corresponds to a modulation method of information to be recorded.

3. A magnetic recording media according to claim 1, wherein, a space between the columns is embedded with a non-magnetic material so that a surface of the recording media is planarized.

4. A magnetic recording media according to claim 1, wherein, the magnetic recording media is configured by embedding the columns into the second magnetic layer.

5. A magnetic recording media according to claim 1, wherein, the columns and the flat region are respectively configured by materials having different permeability, and the permeability of the columns is made higher than the permeability of the flat region.

6. A magnetic recording media according to claim 1, wherein, the second magnetic layer is formed on the columns of the first magnetic layer, and the second magnetic layer is disposed with spaces so as to configure a plurality of tracks in a same manner as the columns.

7. A magnetic recording system comprising the magnetic recording media according to claim 1, a slider having a write head and a read head, gimbals on which the slider is mounted, mechanism for driving these elements, and an interface for interchanging information with a signal processing mechanism.

8. A magnetic recording media having a substrate, a soft magnetic under layer formed on the substrate, and a hard second magnetic layer located over the magnetic under layer, wherein, the magnetic under layer comprises columns regularly arranged to configure a plurality of discrete tracks, with a flat region that magnetically couples the columns, and a permeability of the columns is higher than the permeability of the second magnetic layer, wherein a width of the columns of the magnetic under layer in a track width direction is not more than a bit length of the second magnetic layer in the track width direction, and a length of the columns of the magnetic under layer in a bit length direction is not more than the bit length of the second magnetic layer in the bit length direction.

9. A magnetic recording media according to claim 8, wherein, the second magnetic layer is formed on the columns of the magnetic under layer.

10. A magnetic recording media according to claim 8, wherein, a first period of the columns of the magnetic under layer in the track width direction corresponds to a track pitch, and the length of the columns in the track width direction is smaller than the track pitch.

11. A magnetic recording media according to claim 10, wherein, a second period of the columns of the magnetic under layer in the bit length direction corresponds to a bit length.

12. A magnetic recording media according to claim 10, having a portion which holds tracking information allowing the second magnetic layer disposed on the columns to follow as a recording bit.

13. A magnetic recording media according to claim 11, wherein, said substrate is a disk-shaped substrate, and the columns of the magnetic under layer formed on the disk-shaped substrate are configured as a rectangular column, an elliptic cylinder, or a similar columnar structure, which are disposed with an angle corresponding to a yaw angle of a magnetic head with respect to a disk radial direction, for a purpose of perpendicular recording.

14. A magnetic recording media according to claim 8, wherein, a height of the columns of the magnetic under layer is at least 2% of a track pitch.

15. A magnetic recording media according to claim 8, wherein, a height or a digging depth of the columns of the magnetic under layer is at least 5 nm.

16. A magnetic recording media according to claim 8, wherein, the second magnetic layer is disposed with spaces so as to configure the plurality of tracks in a same manner as the columns, and the length of the columns of the magnetic under layer in the track width direction is equal to or less than the spaces between the tracks of the second magnetic layer.

17. A magnetic recording media according to claim 8, wherein, the columns comprise at least two layers of soft magnet, and a soft magnet on a side closer to the second magnetic layer is made of a material with permeability higher than that of the material of the soft magnet on a side away from the second magnetic layer.

18. A magnetic recording media according to claim 8, wherein, a space between the columns is filled with a material having permeability lower than that of the columns.

19. A magnetic recording media according to claim 8, having a flat soft magnetic layer and said second magnetic layer formed with a periodic concavity and convexity, instead of the magnetic under layer with columns, and configured with an under layer having concave portions embedded with a high-permeability material.

* * * * *